United States Patent
Spomer et al.

(10) Patent No.: US 9,329,017 B2
(45) Date of Patent: May 3, 2016

(54) ALIGNMENT TOOL

(75) Inventors: Michael Spomer, Longmont, CO (US); Stephen Anderson, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 73 days.

(21) Appl. No.: 14/382,636

(22) PCT Filed: Mar. 20, 2012

(86) PCT No.: PCT/US2012/029804
§ 371 (c)(1),
(2), (4) Date: Sep. 3, 2014

(87) PCT Pub. No.: WO2013/141850
PCT Pub. Date: Sep. 26, 2013

(65) Prior Publication Data
US 2015/0020394 A1  Jan. 22, 2015

(51) Int. Cl.
*G01B 5/25* (2006.01)
*G02B 7/00* (2006.01)
*G01F 1/84* (2006.01)
*G01B 5/00* (2006.01)

(52) U.S. Cl.
CPC .............. *G01B 5/25* (2013.01); *G01B 5/0007* (2013.01); *G01F 1/8409* (2013.01); *G01F 1/8413* (2013.01); *G01F 1/8477* (2013.01); *G02B 7/004* (2013.01)

(58) Field of Classification Search
CPC ... G01F 1/8409; G01F 1/8413; G01F 1/8477; G01B 5/25; G01B 5/007
USPC ........................................... 33/533, 567, 568
See application file for complete search history.

(56) References Cited

U.S. PATENT DOCUMENTS

| | | | | |
|---|---|---|---|---|
| 3,164,909 A * | 1/1965 | Rosenberg | ........... | G05B 19/373 318/567 |
| 3,846,917 A * | 11/1974 | Blakey | ..................... | G01B 3/00 269/900 |
| 4,509,269 A | 4/1985 | Leitz | | |
| 4,593,476 A * | 6/1986 | Clark | ..................... | G01B 5/207 33/529 |
| 5,048,195 A * | 9/1991 | Leonov | ..................... | G01B 5/24 33/533 |
| 5,481,811 A * | 1/1996 | Smith | .................... | B23Q 3/103 269/88 |
| 6,145,212 A | 11/2000 | Geise et al. | | |
| 7,036,236 B1 | 5/2006 | Drescher et al. | | |
| 7,854,072 B2 * | 12/2010 | Stark | ......................... | B25B 1/10 33/537 |
| 2006/0005413 A1* | 1/2006 | Sinha | ...................... | B23Q 1/34 33/568 |
| 2008/0155846 A1* | 7/2008 | Li | ........................... | G01B 5/285 33/533 |
| 2008/0156066 A1* | 7/2008 | Jeromin | .................... | G01B 3/30 73/1.81 |
| 2010/0269362 A1* | 10/2010 | Bos | ....................... | G01B 5/0002 33/503 |
| 2015/0168120 A1* | 6/2015 | Cupertino | ................ | G01B 3/30 33/194 |

* cited by examiner

*Primary Examiner* — G. Bradley Bennett
(74) *Attorney, Agent, or Firm* — The Ollila Law Group LLC

(57) ABSTRACT

An alignment tool assembly (200) is provided. The alignment tool assembly (200) includes a base (201) and a mounting plate (202) coupled to the base (201). The alignment tool assembly (200) further includes one or more alignment blocks (204, 205, 205') movable with respect to the mounting plate (202). One or more gauge apertures (250) are formed in the mounting plate (202) proximate an alignment block (204, 205, 205') of the one or more alignment blocks (204, 205, 205') sized and positioned to receive a portion of an alignment gauge (300).

12 Claims, 10 Drawing Sheets

ALIGNMENT TOOL

TECHNICAL FIELD

The embodiments described below relate to, tool assemblies, and more particularly, to an alignment gauge for an alignment tool assembly.

BACKGROUND OF THE INVENTION

Vibrating meters such as, for example, densitometers, volumetric flow meters, and Coriolis flow meters are used for measuring one or more characteristics of substances, such as, for example, a density, a mass flow rate, a volume flow rate, a totalized mass flow, a temperature, and other information. Vibrating meters include one or more conduits, which may have a variety of shapes, such as, for example, straight, U-shaped, or irregular configurations. The measured fluid may comprise a liquid, a gas, or a combination thereof. The liquid may include suspended particulates.

The one or more conduits have a set of natural vibration modes, including, for example, simple bending, torsional, radial, and coupled modes. The one or more conduits are vibrated by at least one driver at a resonance frequency in one of these modes, hereinafter referred to as the drive mode, for purposes of determining a characteristic of the substance. One or more meter electronics transmit a sinusoidal drive signal to the at least one driver, which is typically a magnet/coil combination, with the magnet typically being affixed to the conduit and the coil being affixed to a mounting structure or to another conduit. The driver signal causes the driver to vibrate the one or more conduits at the drive frequency in the drive mode. For example, the driver signal may be a periodic electrical current transmitted to the coil.

One or more pick-offs detect the motion of the conduit(s) and generate a pick-off signal representative of the motion of the vibrating conduit(s). The pick-off is typically a magnet/coil combination, with the magnet typically being affixed to one conduit and the coil being affixed to a mounting structure or to another conduit. The pick-off signal is transmitted to the one or more electronics; and according to well-known principles, the pick-off signal may be used by the one or more electronics to determine a characteristic of the substance or adjust the driver signal, if necessary.

Positioning of the driver as well as the pick-offs is typically performed on an alignment tool assembly with various alignment blocks. The alignment blocks can slide into place and hold mounting brackets that are used to couple the driver and pick-offs to the vibrating meter's tubes. In order to achieve optimum performance out of the vibrating meter, the precise positioning of the driver and pick-offs, and thus, the brackets is important. For example, the distance between the pick-offs may be critical to optimum operation of the vibrating meter. While the alignment tool assembly originally provides the necessary positioning, over time, the alignment blocks can move out of proper alignment due to wear, damage, etc. Therefore, the prior art periodically takes the alignment tool assembly out of production to perform maintenance, including ensuring proper positioning of the alignment pieces. Unfortunately, taking the alignment tool assembly off-line results in a downtime in production.

Therefore, there is a need in the art for a system that can quickly and accurately ensure the correct positioning of the alignment pieces of the alignment tool assembly. There is a need in the art for a system that can ensure the positioning of the alignment pieces without having to move the alignment tool assembly to a specialized testing facility.

The embodiments described below overcome these and other problems and an advance in the art is achieved. The embodiments described below provide an alignment tool assembly with gauge apertures formed in the alignment tool assembly's mounting plate that can accept alignment gauges in order to test the positioning of one or more alignment blocks. The alignment gauges allows the alignment tool assembly to be tested quickly without moving the alignment tool assembly to a specialized testing area.

SUMMARY OF THE INVENTION

An alignment tool assembly is provided according to an embodiment. The alignment tool assembly comprises a base and a mounting plate coupled to the base. According to an embodiment, the alignment tool assembly further comprises one or more alignment blocks movable with respect to the mounting plate. According to an embodiment, one or more gauge apertures are formed in the mounting plate proximate an alignment block of the one or more alignment blocks sized and positioned to receive a portion of an alignment gauge.

An alignment gauge for an alignment tool assembly is provided according to an embodiment. The alignment gauge comprises one or more legs sized and shaped to engage one or more gauge apertures formed in the alignment tool assembly. According to an embodiment, the alignment gauge further comprises an alignment block receiving face and one or more projections extending from the alignment block receiving face and with each of the one or more projections configured to engage a bracket receiving aperture formed in an alignment block of the alignment tool assembly.

A method for confirming a position of an alignment block of an alignment tool assembly is provided according to an embodiment. The method comprises a step of engaging an alignment gauge with a mounting plate of the alignment tool assembly. According to an embodiment, the method further comprises steps of moving the alignment block with respect to the mounting plate from a first position towards a second position and confirming a proper positioning of the alignment block if one or more projections extending from the alignment gauge engages one or more bracket apertures formed in the alignment block when the alignment block reaches a threshold position.

ASPECTS

According to an aspect, an alignment tool assembly comprises:
  a base;
  a mounting plate coupled to the base;
  one or more alignment blocks movable with respect to the mounting plate; and
  one or more gauge apertures formed in the mounting plate proximate an alignment block of the one or more alignment blocks sized and positioned to receive a portion of an alignment gauge.

Preferably, the alignment tool assembly further comprises one or more tracks coupled to the mounting plate, wherein each of the one or more alignment blocks is movable along a track of the one or more tracks.

Preferably, the alignment tool assembly further comprises one or more bracket apertures formed in each of the one or more alignment blocks.

According to another aspect, an alignment gauge for an alignment tool assembly comprises:
  one or more legs sized and shaped to engage one or more gauge apertures formed in the alignment tool assembly;

an alignment block receiving face; and
one or more projections extending from the alignment block receiving face and with each of the one or more projections configured to engage a bracket receiving aperture formed in an alignment block of the alignment tool assembly.

Preferably, the alignment gauge further comprises a base including two or more arms.

Preferably, the two or more arms are separated to define at least a portion of the alignment block receiving face.

According to an aspect, a method for confirming a position of an alignment block of an alignment tool assembly comprises steps of:
engaging an alignment gauge with a mounting plate of the alignment tool assembly;
moving the alignment block with respect to the mounting plate from a first position towards a second position; and
confirming a proper positioning of the alignment block if one or more projections extending from the alignment gauge engages one or more bracket apertures formed in the alignment block when the alignment block reaches a threshold position.

Preferably, the method further comprises a step of determining the alignment block is not in a proper position if the one or more projections do not engage the one or more bracket apertures upon the alignment block reaching the threshold position.

Preferably, the step of engaging the alignment gauge with the mounting plate comprises engaging one or more legs with one or more gauge apertures formed in the mounting plate.

Preferably, the step of moving the alignment block comprises sliding the alignment block along a track coupled to the mounting plate.

Preferably, the step of moving the alignment block comprises moving the alignment block between two arms of the alignment gauge.

Preferably, the one or more projections extend from an alignment block receiving face of the alignment gauge.

DETAILED DESCRIPTION OF THE INVENTION

FIGS. 1-10 and the following description depict specific examples to teach those skilled in the art how to make and use the best mode of embodiments of a gauge. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the gauge. As a result, the embodiments described below are not limited to the specific examples described below, but only by the claims and their equivalents.

Figure 1:
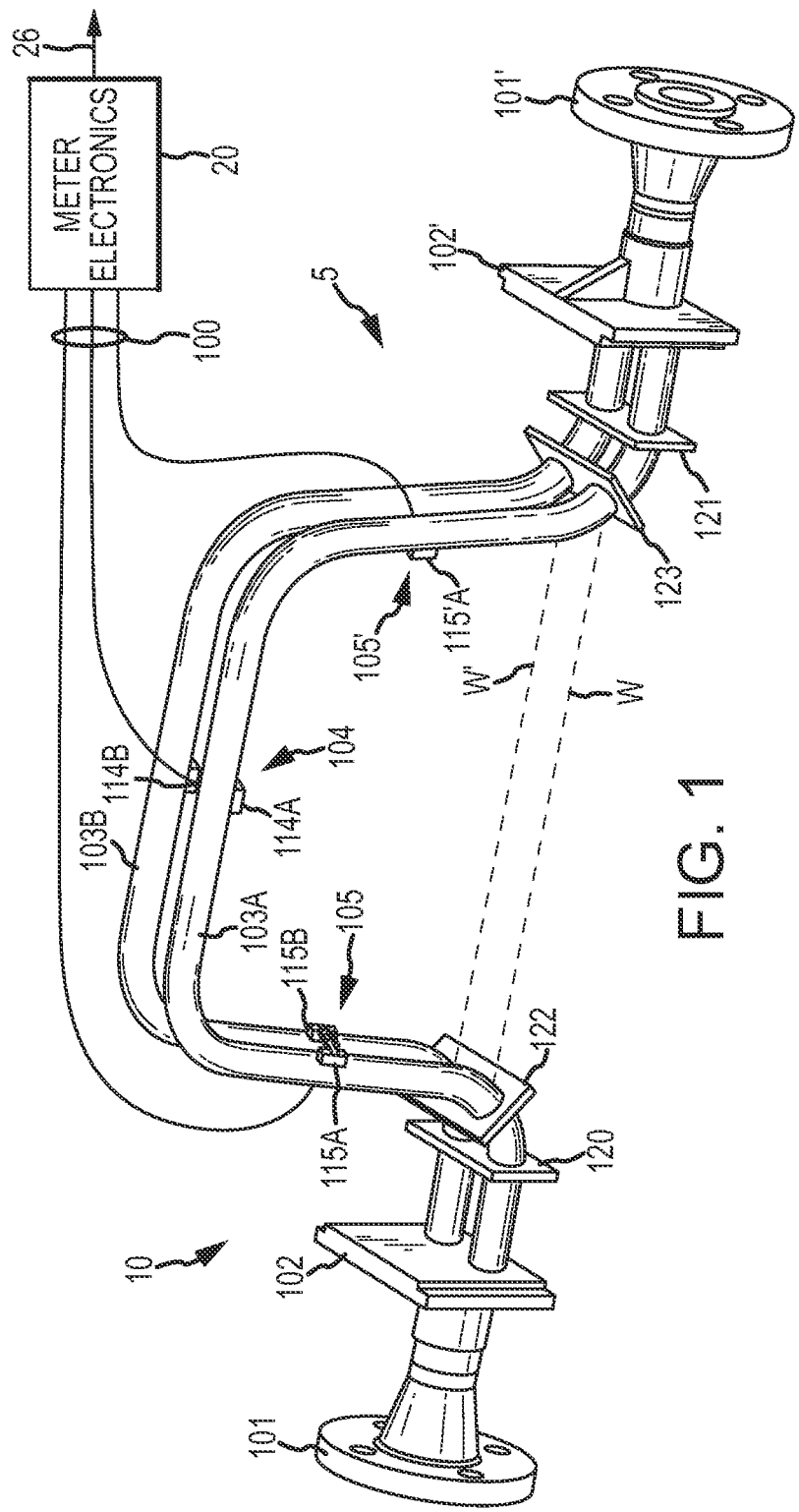
FIG. 1 shows a vibrating meter according to an embodiment.

FIG. 1 shows a vibrating meter 5 in the form of a meter comprising a sensor assembly 10 and one or more meter electronics 20. The vibrating meter 5 may comprise a Coriolis flow meter, a volumetric flow meter, a densitometer, etc. The meter electronics 20 is connected to the sensor assembly 10 via leads 100 to measure a characteristic of a substance, such as, for example, a fluid density, a mass flow rate, a volume flow rate, a totalized mass flow, a temperature, and other information over path 26.

Figure 5:
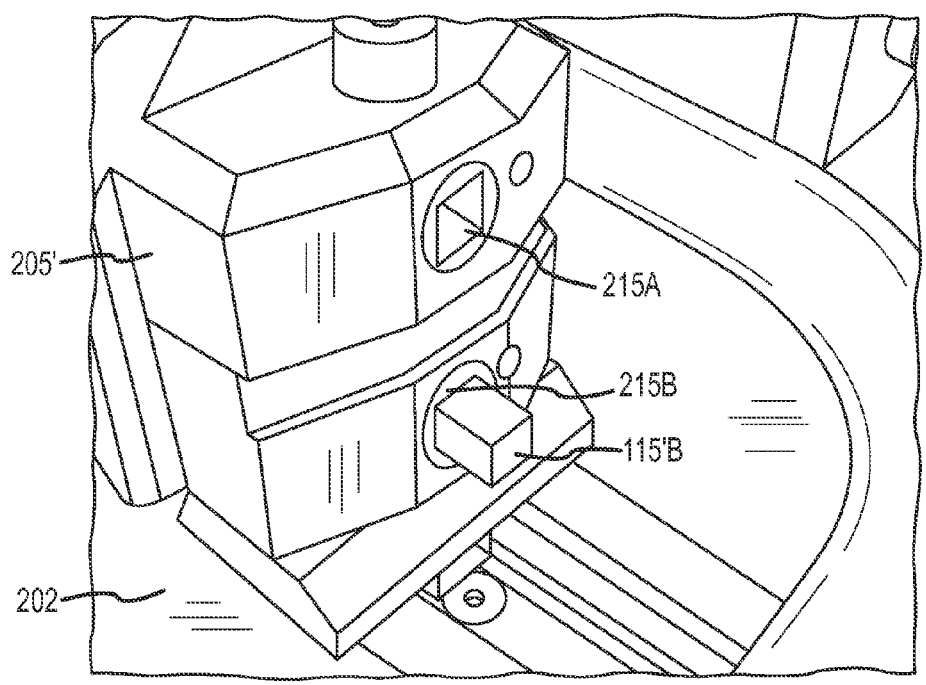
FIG. 5 shows an alignment block of the alignment tool assembly according to an embodiment.
Figure 6:
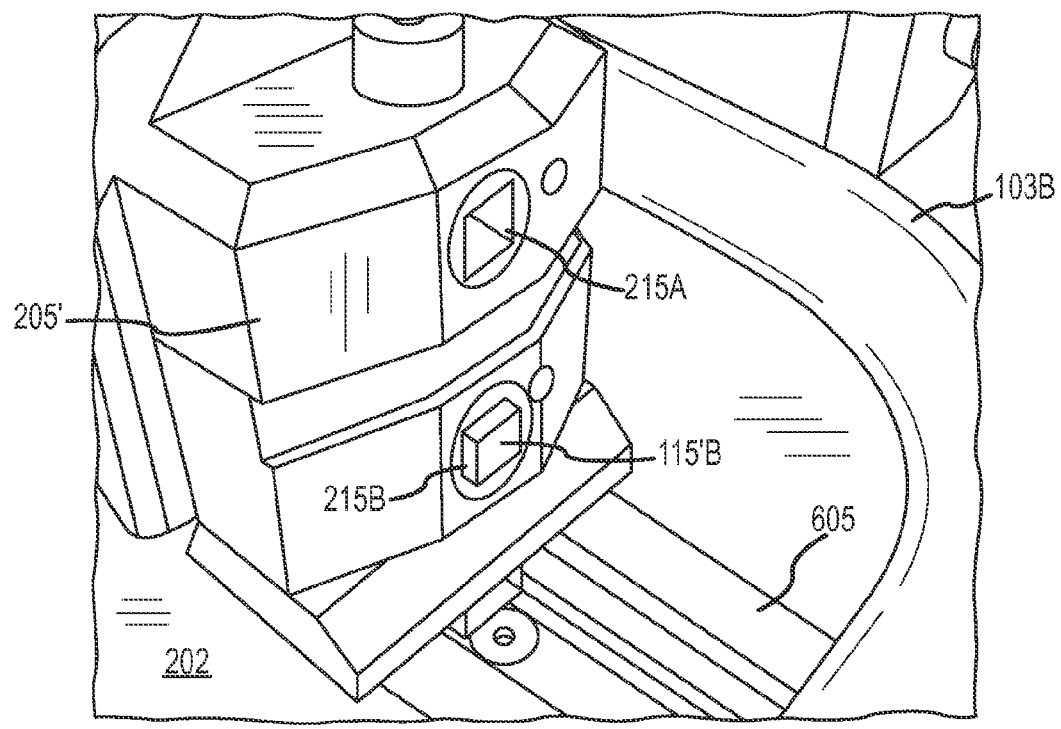
FIG. 6 shows the alignment block with a mounting bracket according to an embodiment.
Figure 7:
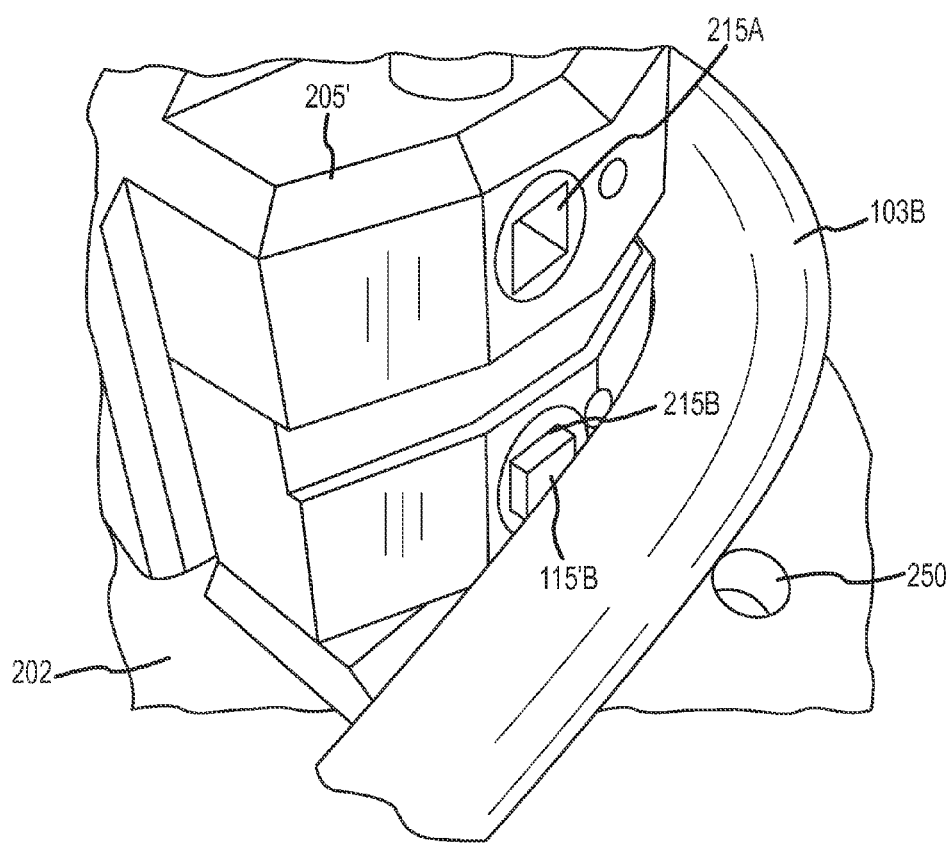
FIG. 7 shows the alignment block in a second position with the mounting bracket contacting the fluid tube and ready for coupling according to an embodiment.

The sensor assembly 10 of the present example includes a pair of flanges 101, 101'; manifolds 102, 102'; a driver 104; pick-offs 105, 105'; and conduits 103A, 103B. The driver 104 and pick-offs 105, 105' are coupled to the fluid conduits 103A and 103B using mounting brackets 114A, 114B, 115A, 115B, 115'A, and 115'B. The mounting bracket 115'B is not visible in FIG. 1; however, as can be seen in FIGS. 5-7, the mounting bracket 115'B is coupled to the fluid conduit 103B substantially adjacent the mounting bracket 115'A such that one portion of the pick-off sensor 105' can be coupled to the mounting bracket 115'A and the other portion can be coupled to the mounting bracket 115'B.

According to an embodiment, the mounting brackets 114A, 114B, 115A, 115B, 115'A, and 115'B can be welded or otherwise coupled to the conduits 103A, 103B at precise positions. For example, the driver 104 is shown coupled to the fluid conduits 103A, 103B in a position where the driver 104 can vibrate a portion of the fluid conduits 103A, 103B in a drive mode. The pick-offs 105, 105' are coupled to the conduits 103A, 103B in order to detect motion of the conduits 103A, 103B. As can be appreciated, if the driver 104 and pick-offs 105, 105' are not positioned in the correct locations, the measurements obtained from the sensor assembly 10 may not be accurate.

It should be appreciated by those skilled in the art that it is within the scope of the present embodiment to use the principles discussed herein in conjunction with any type of vibrating meter, including vibrating meters that lack the measurement capabilities of a Coriolis flow meter. Examples of such devices include vibrating densitometers, volumetric flow meters, etc.

Flanges 101, 101' of the present example are coupled to the manifolds 102, 102'. The manifolds 102, 102' of the present example are affixed to opposite ends of the fluid conduits 103A, 103B. Brace bars 120-123 are further coupled to the fluid conduits 103A, 103B to define the bending axes W, W' of the fluid conduits 103A, 103B. When the sensor assembly 10 is inserted into a pipeline system (not shown) which carries the substance, the substance enters sensor assembly 10 through the flange 101, passes through the inlet manifold 102 where the total amount of material is directed to enter the conduits 103A, 103B, flows through the conduits 103A, 103B, and back into the outlet manifold 102' where it exits the sensor assembly 10 through the flange 101'.

As mentioned above, in many situations, the positioning of the driver 104 and the pick-offs 105, 105' is critical to optimal operation of the vibrating meter 5. Consequently, the positioning of the mounting brackets 114A, 114B, 115A, 115B, 115'A, and 115'B is important. According to an embodiment, at least part of the assembly of the sensor assembly 10 including the positioning of the sensor assembly's elements is completed using an alignment tool assembly, such as the alignment tool assembly 200.

Figure 2:
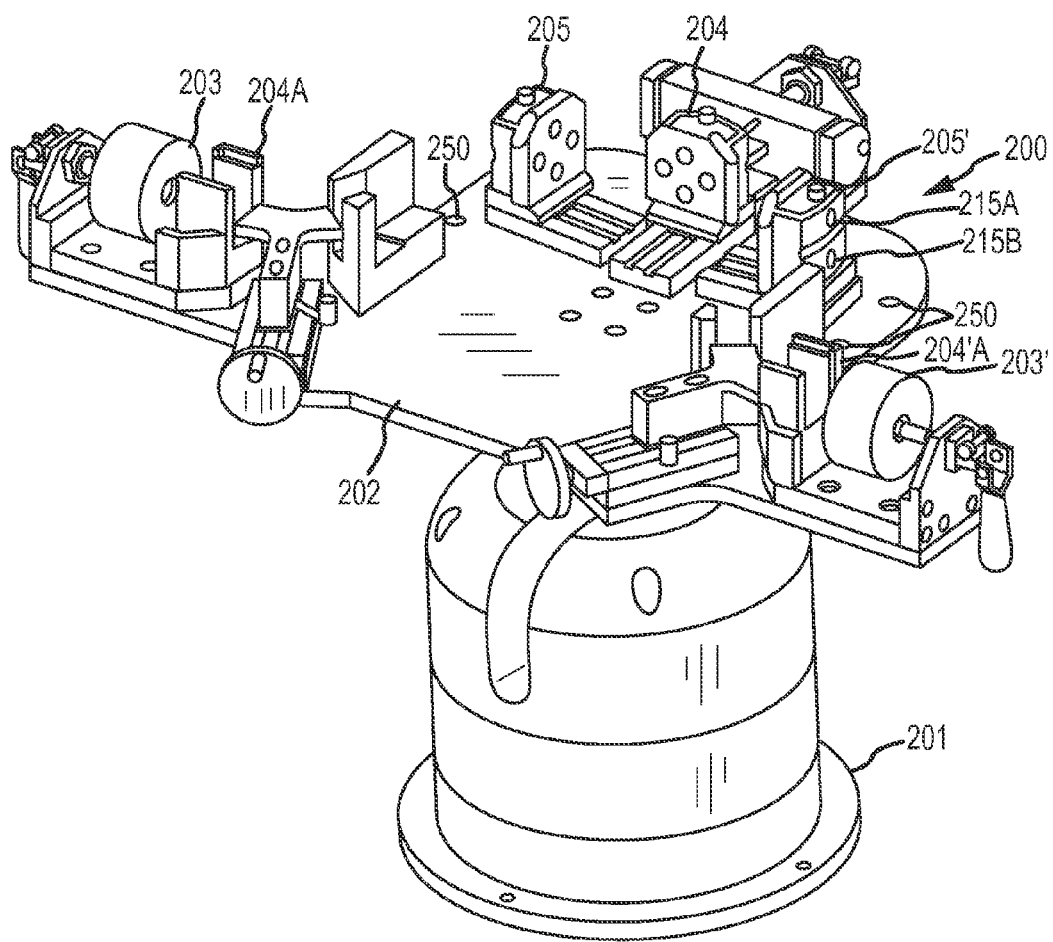
FIG. 2 shows an alignment tool assembly for assembling a sensor assembly of a vibrating meter according to an embodiment.

FIG. 2 shows an alignment tool assembly 200 according to an embodiment. In the embodiment shown, the alignment tool assembly 200 is for assembling a sensor assembly 10 according to an embodiment; however, the alignment tool assembly 200 may be used to aligning and assembling other devices and the use of the alignment tool assembly 200 for assembling sensor assemblies is merely provided as an example. The alignment tool assembly 200 includes a base 201 and a mounting plate 202 coupled to the base 201. The base 201 may be coupled to a floor or other stationary surface, for example. According to an embodiment, coupled to the mounting plate 202 are a first manifold register 203 and 240A and a second manifold register 203' and 240'A. The registers can position the flow conduits 103A, 103B, manifolds 101, 101', and brace bars 120-123 in the proper location. In some embodiments, the various components of the sensor assembly 10 are positioned by sliding down onto the mounting plate 202. For example, the manifolds 102, 102' and the brace bars 120-123 may already be coupled to the fluid conduits 103A, 103B and the registers can clamp the components in place to maintain the precise positioning of the fluid conduits 103A, 103B.

According to an embodiment, the alignment tool assembly 200 further comprises one or more movable alignment blocks 204, 205, and 205'. According to an embodiment, the alignment blocks 204, 205, 205' are movable between a first position (See FIGS. 4-6 and 9) and at least a second position (shown in FIGS. 2, 7, and 10). According to an embodiment, the alignment blocks 204, 205, 205' are provided to hold and align the mounting brackets for the driver 104, and pick-offs 105, 105' while the mounting brackets are being coupled to the fluid conduits 103A, 103B. Consequently, the alignment blocks 204, 205, 205' are movable with respect to the mounting plate 202 in order to allow a worker to insert the appropriate mounting bracket into a bracket aperture, such as one of the bracket apertures 215A, 215B formed in the alignment block 205' and visible in FIG. 2. In FIG. 2, the bracket aperture 215A would be positioned to receive the mounting bracket 115'A while the bracket aperture 215B is positioned to receive the mounting bracket 115'B. Although the mobility of the alignment blocks 204, 205, and 205' make assembly much easier, the movable alignment blocks 204, 205, and 205' are subject to wear and damage that can misalign the alignment blocks 204, 205, and 205'.

The prior art has dealt with confirming the proper positioning of the alignment blocks 204, 205, and 205' in a number of ways. Some example prior art approaches include taking the entire assembly tool 200 to a measurement lab, bringing specialized measurement instruments to the assembly tool 200, or performing periodic inspections of the welded brackets after sensor assembly 10 is assembled. None of these approaches provide a satisfactory solution. Each approach requires long periods of downtime while the alignment block position is being confirmed.

In order to quickly and accurately confirm the proper positioning of the alignment blocks 204, 205, and 205', the mounting plate 202 according to the present embodiment includes one or more gauge apertures 250. In FIG. 2, only three of the gauge apertures 250 are visible. However, it should be appreciated that one or more gauge apertures 250 are provided proximate each alignment block 204, 205, and 205'. According to an embodiment, two gauge apertures 250 are positioned proximate each alignment block 204, 205, and 205'. However, any number of gauge apertures 250 may be provided. According to an embodiment, the gauge apertures 250 are sized and positioned to receive a portion of an alignment gauge 300 (See FIG. 3).

Figure 3:
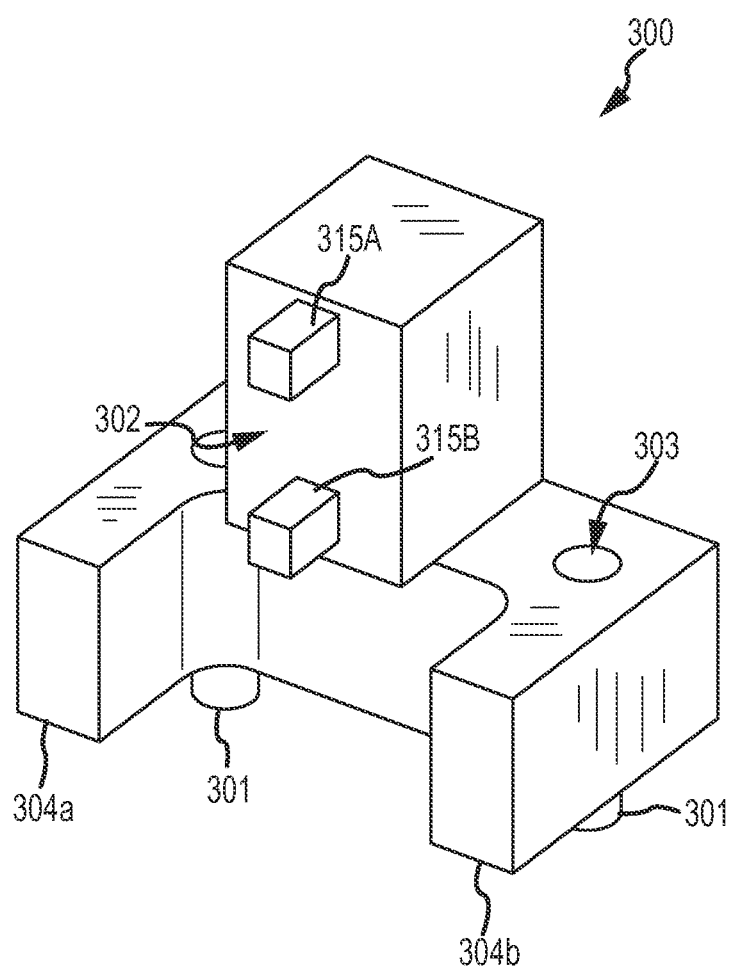
FIG. 3 shows an alignment gauge according to an embodiment.

FIG. 3 shows an alignment gauge 300 according to an embodiment. According to an embodiment, the alignment gauge 300 comprises one or more legs 301, which are configured to engage the one or more gauge apertures 250 formed in the mounting plate 202. According to an embodiment, the one or more legs 301 extend from a base 303. The base 303 shown in FIG. 3 comprises two arms 304a, 304b. The arms 304a, 304b are spaced from one another to create an alignment block receiving face 302. The arms 304a, 304b can be separated by a distance that is at least as great as the width of the alignment blocks 204, 205, 205' such that at least a portion of the alignment blocks 204, 205, 205' can fit between the arms 304a, 304b.

According to an embodiment, the alignment block receiving face 302 can include one or more projections 315A, 315B. The one or more projections 315A, 315B extending from the alignment block receiving face 302 can be sized and positioned to engage the bracket apertures 215A, 215B formed in the alignment blocks 204, 205, 205'. According to an embodiment, the one or more projections 315A, 315B are substantially perpendicular to the legs 301. However, in other embodiments, the angle between the projections 315A, 315B and the legs 301 may be different.

According to an embodiment, engagement between the projections 315A, 315B and the apertures 215A, 215B can be indicative of proper positioning of the alignment block when the legs 301 are engaged with the gauge apertures 250. Conversely, if the projections 315A, 315B do not line up with the apertures 215A, 215B of the alignment block when the legs 301 are engaged with the gauge apertures 250, the user can be alerted that the alignment block is out of position.

Operation and determination of the proper positioning of the alignment blocks will now be described.

Figure 4:
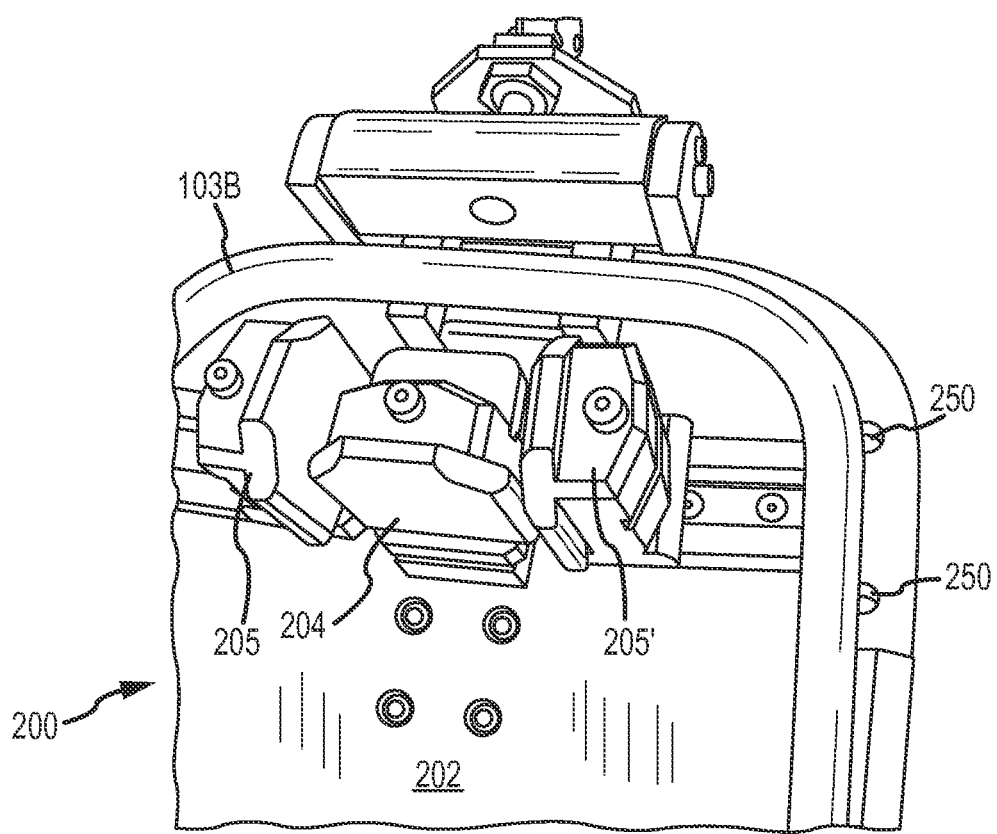
FIG. 4 shows a portion of the alignment tool assembly with a fluid conduit according to an embodiment.

FIG. 4 shows a top view of a portion of the alignment tool assembly 200 with one fluid conduit 103B of the sensor assembly 10 positioned on the mounting plate 202. In the embodiment shown, the alignment blocks 204, 205, 205' are in a first (or retracted) position. With the alignment blocks 204, 205, 205' in the first position, the fluid conduit 103B may be held in position by the registers 203, 203', 240A, and 240'A, for example. As shown in FIG. 4, the fluid conduit 103B is bare of the driver 104 and the pick-offs 105, 105'. In order to attach the driver 104 and pick-offs 105, 105', the mounting brackets 114B, 115B, and 115'B need to be coupled to the fluid conduit 103B.

FIG. 5 shows an alignment block 205' according to an embodiment. In the embodiment shown in FIG. 5, the bracket aperture 215B formed in the alignment block 205' has received the mounting bracket 115'B for the pick-off 105'. According to an embodiment, the mounting bracket 115'B may be formed from a metal that can be welded to the fluid conduit 103B. However, it should be appreciated that the mounting bracket 115'B does not have to be formed from metal and other materials may be used. For example, if the mounting bracket 115'B were formed from plastic, the mounting bracket 115'B could be coupled to the fluid conduit 103B using an adhesive. Therefore, there are numerous ways of coupling the mounting brackets to the fluid conduits and the particular method used should in no way limit the scope of the present embodiment.

FIG. 6 shows the mounting bracket 115'B fully inserted into the bracket aperture 215B. With the mounting bracket 115'B fully inserted into the bracket aperture 215B, the mounting bracket 115'B is ready to be coupled to the fluid conduit 103B. As can be seen in FIG. 6, the alignment block 205' can be slid into position by sliding along the track 605. The repeated sliding of the alignment block 205' can wear down the components of the track 605, the alignment block 205', or both leading to misalignment of the alignment block 205'.

FIG. 7 shows the alignment block 205' moved from the first position shown in FIGS. 4-6 to the second position. In the second position, the alignment block 205' brings the mounting bracket 115'B into contact with the fluid conduit 103B so the mounting bracket 115'B can be welded or otherwise coupled to the fluid conduit 103B. Once the mounting bracket 115'B is coupled to the fluid conduit 103B, the alignment block 205' can be moved back to the first position upon which the mounting bracket 115'B is withdrawn from the bracket aperture 215B.

It should be appreciated that a similar procedure can be repeated for each of the mounting brackets of the sensor assembly 10. According to one embodiment, all of the mounting brackets for one fluid conduit can be coupled to the fluid conduit and then the mounting brackets of the other fluid conduit can be coupled. For example, in the configuration shown, the mounting brackets 114B, 115B, and 115'B can be coupled to the fluid conduit 103B and then the fluid conduit 103A can be brought into position and the mounting brackets 114A, 115A, 115'A can be coupled to the fluid conduit 103A.

As discussed above, maintaining the correct positioning of the alignment blocks 204, 205, 205' is often critical to ensuring accurate measurements from the completed vibrating meter 5. Therefore, between assembling the sensor assemblies 10, the alignment and positioning of the alignment blocks 204, 205, 205' can be periodically tested using the alignment gauge 300.

Figure 8:
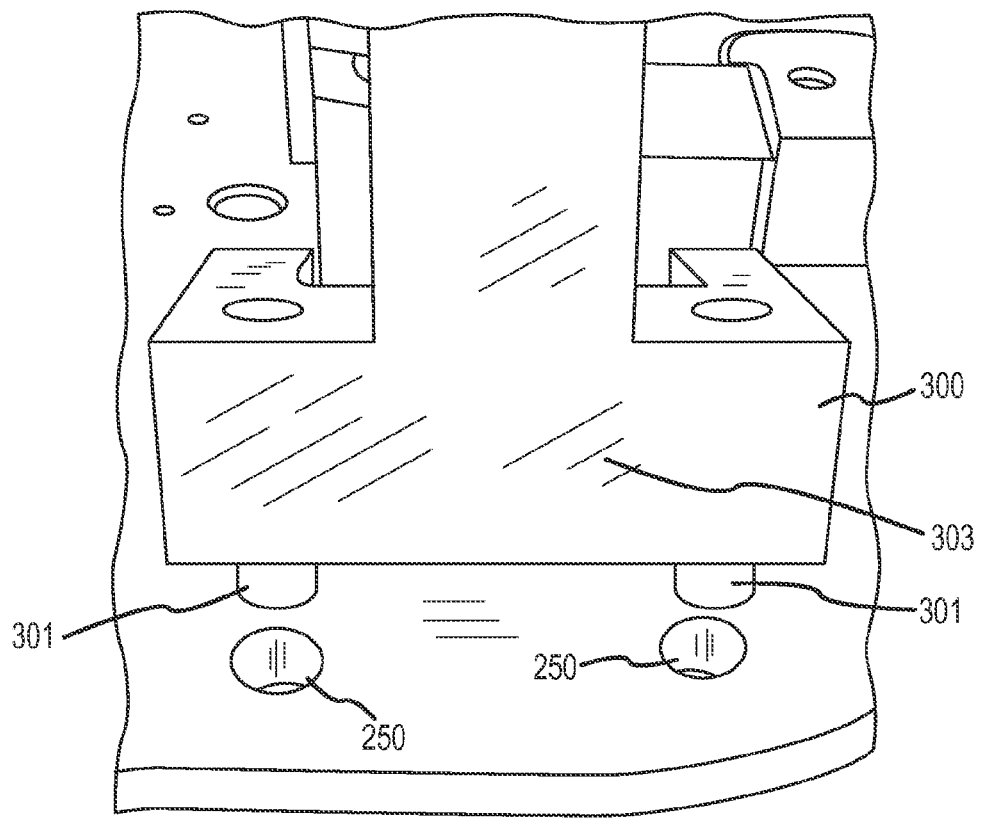
FIG. 8 shows the alignment gauge prior to engaging the alignment tool assembly.

FIG. 8 shows a side view of the alignment gauge 300 just prior to engaging the legs 301 with the gauge apertures 250. As can be appreciated, the alignment gauge 300 is being positioned without the sensor assembly 10 being positioned on the alignment assembly tool 200. The position of the gauge apertures 250 is chosen so that the alignment gauge 300 can verify the alignment block's positioning when the legs 301 are engaged with the gauge apertures 250. Prior art mounting plates do not include the gauge apertures 250. Therefore, prior art mounting plates could not accept the alignment gauge 300 to perform on board gauging.

Figure 9:
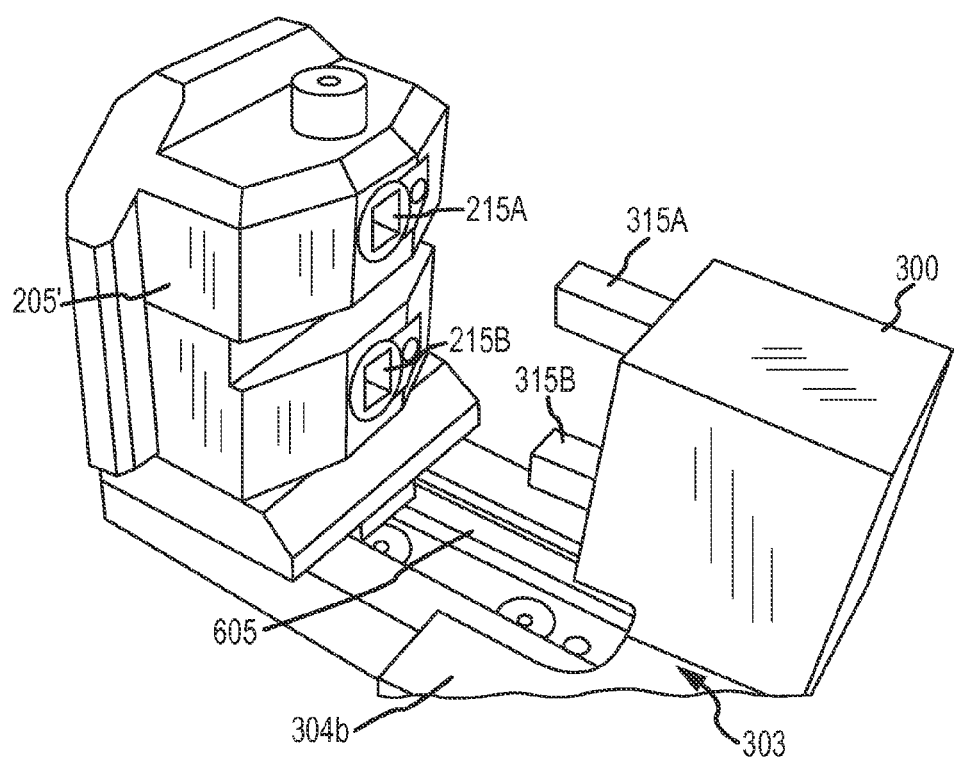
FIG. 9 shows the alignment gauge engaged with the mounting plate of the alignment tool assembly according to an embodiment.

FIG. 9 shows the alignment gauge 300 engaged with the gauge apertures 250 according to an embodiment. In the embodiment shown in FIG. 9, the alignment gauge 300 is ready to test the position of the alignment block 205'. However, the alignment block 205' is still in the first position and has not yet been moved past a threshold position to engage the alignment gauge 300.

Figure 10:
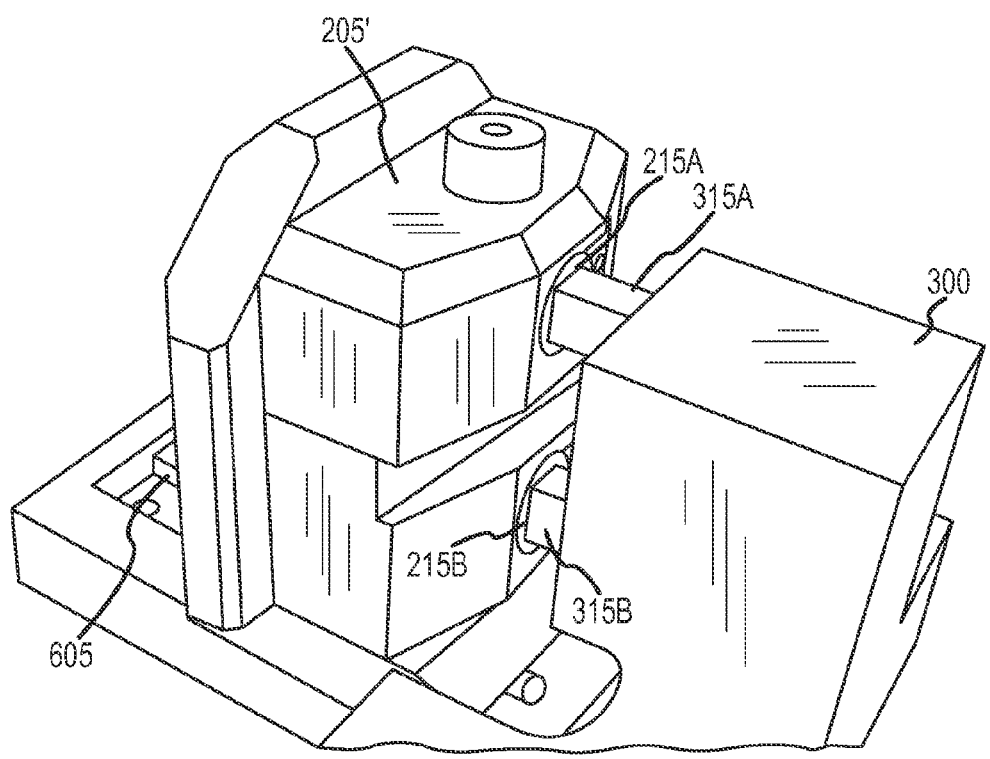
FIG. 10 shows the alignment gauge engaged with the mount of the alignment tool assembly and with the alignment block according to an embodiment.

FIG. 10 shows the alignment block 205' moved from the first position towards the second position. It should be appreciated, that the alignment block 205' may not have to move all the way to the second position in order to verify the alignment block's positioning. As shown with the alignment block 205' moved partially towards the second position, the projections 315A, 315B have engaged the block apertures 215A, 215B formed in the alignment block 205'. The projections 315A, 315B engage the block apertures 215A, 215B once the alignment block 205' reaches the threshold position. The threshold position may be dependent upon the positioning of the gauge apertures 250 as well as the length of the projections 315A, 315B. With the projections 315A, 315B engaged with the block apertures 215A, 215B, the proper positioning of the alignment block 205' is confirmed. Conversely, if the positioning of the alignment block 205' had shifted due to damage or wear, for example, the projections 315A, 315B would not be able to engage the block apertures 215A, 215B when the alignment block 205' reaches the threshold position and a user or operator would be alerted of the misalignment of the alignment block 205'.

With the positioning of the alignment block 205' confirmed, the alignment block 205' can be moved back to the first position and the alignment gauge 300 can be removed. Normal operation of the alignment assembly tool 200 can be resumed.

It should be appreciated that while the testing of the alignment block 205' is described, similar testing can be performed for each of the other alignment blocks 204, 205 in a similar manner. In some embodiments, the same alignment gauge 300 may be used to test the positioning of all of the alignment blocks 204, 205, and 205'. In other embodiments, a different alignment gauge 300 may be required for each of the alignment blocks 204, 205, 205'.

According to an embodiment, the positioning of the alignment blocks 204, 205, 205' may be tested based on a number of assembled sensor assemblies 10. For example, the positioning of the alignment blocks 204, 205, 205' may be tested after every n assembled sensor assemblies 10. In another embodiment, the positioning of the alignment blocks 204, 205, 205' may be tested at regular time intervals regardless of how many sensor assemblies 10 have been assembled. In yet another embodiment, the positioning of the alignment blocks 204, 205, 205' may be tested at random based on a user or operator. The particular timing of testing the position of the alignment blocks 204, 205, 205' is not important for purposes of the present embodiment and should in no way limit the scope of the present embodiment.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description. Thus, although specific embodiments are described herein for illustrative purposes, various equivalent modifications are possible within the scope of the present description, as those skilled in the relevant art will recognize. The teachings provided herein can be applied to other tool assemblies, and not just to the embodiments described above and shown in the accompanying figures. Accordingly, the scope of the embodiments described above should be determined from the following claims.

We claim:

1. An alignment tool assembly (200), comprising:
a base (201);
a mounting plate (202) coupled to the base (201);
one or more alignment blocks (204, 205, 205') movable with respect to the mounting plate (202); and
one or more gauge apertures (250) formed in the mounting plate (202) proximate an alignment block (204, 205, 205') of the one or more alignment blocks (204, 205, 205') sized and positioned to receive a portion of an alignment gauge (300).

2. The alignment tool assembly (200) of claim 1, further comprising one or more tracks (605) coupled to the mounting plate (202), wherein each of the one or more alignment blocks (204, 205, 205') is movable along a track (605) of the one or more tracks (605).

3. The alignment tool assembly (200) of claim 1, further comprising one or more bracket apertures (215A, 215B) formed in each of the one or more alignment blocks (204, 205, 205').

4. An alignment gauge (300) for an alignment tool assembly (200), comprising:
   one or more legs (301) sized and shaped to engage one or more gauge apertures (250) formed in the alignment tool assembly (200);
   an alignment block receiving face (302); and
   one or more projections (315A, 315B) extending from the alignment block receiving face (302) and with each of the one or more projections (315A, 315B) configured to engage a bracket receiving aperture (215A, 215B) formed in an alignment block (204, 205, 205') of the alignment tool assembly (200).

5. The alignment gauge (300) of claim 4, further comprising a base (303) including two or more arms (304a, 304b).

6. The alignment gauge (300) of claim 5, wherein the two or more arms (304a, 304b) are separated to define at least a portion of the alignment block receiving face (302).

7. A method for confirming a position of an alignment block of an alignment tool assembly, comprising steps of:
   engaging an alignment gauge with a mounting plate of the alignment tool assembly;
   moving the alignment block with respect to the mounting plate from a first position towards a second position; and
   confirming a proper positioning of the alignment block if one or more projections extending from the alignment gauge engages one or more bracket apertures formed in the alignment block when the alignment block reaches a threshold position.

8. The method of claim 7, further comprising a step of determining the alignment block is not in a proper position if the one or more projections do not engage the one or more bracket apertures upon the alignment block reaching the threshold position.

9. The method of claim 7, wherein the step of engaging the alignment gauge with the mounting plate comprises engaging one or more legs with one or more gauge apertures formed in the mounting plate.

10. The method of claim 7, wherein the step of moving the alignment block comprises sliding the alignment block along a track coupled to the mounting plate.

11. The method of claim 7, wherein the step of moving the alignment block comprises moving the alignment block between two arms of the alignment gauge.

12. The method of claim 7, wherein the one or more projections extend from an alignment block receiving face of the alignment gauge.

* * * * *